Figure 1:
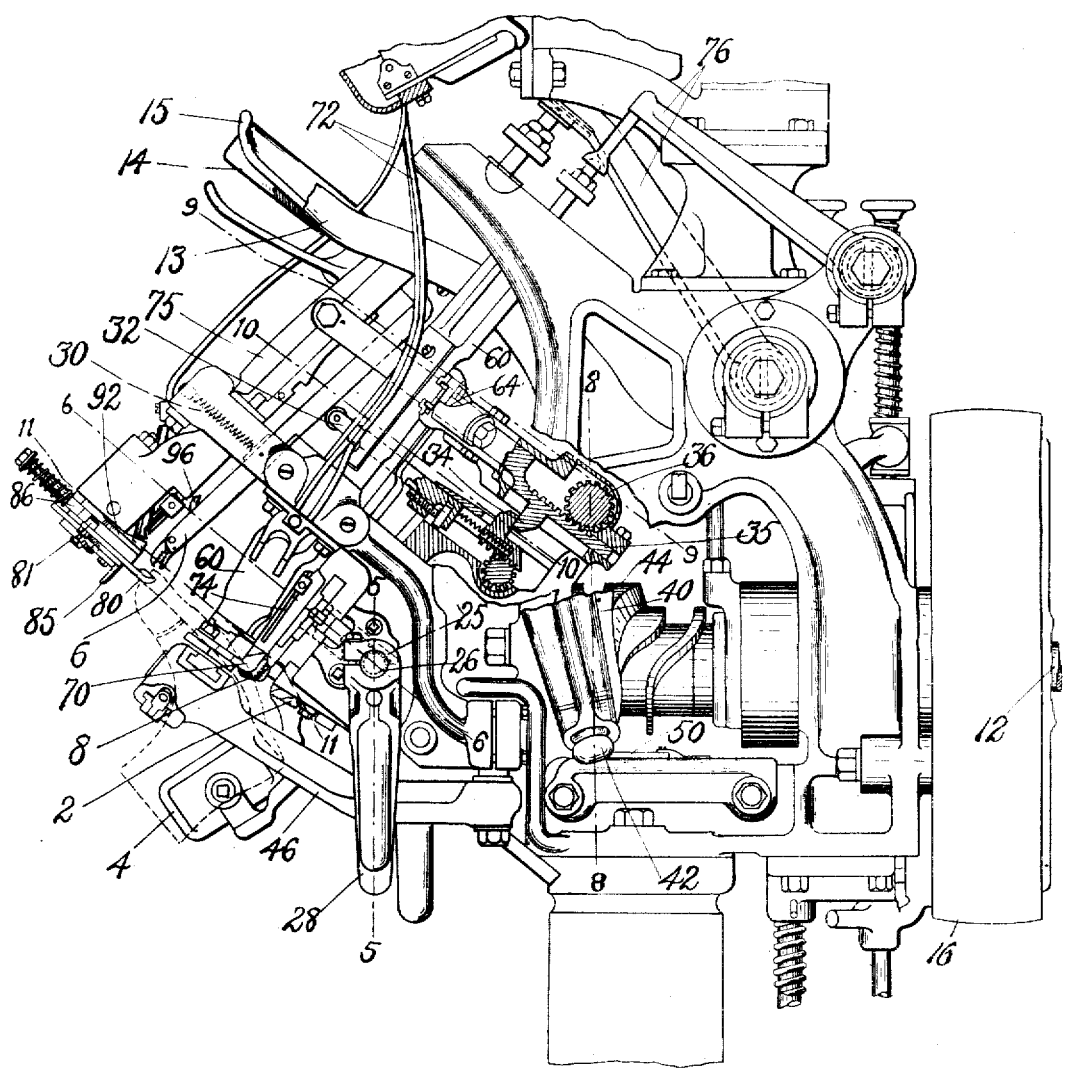

R. F. McFEELY.
MACHINE FOR USE IN THE MANUFACTURE OF BOOTS AND SHOES.
APPLICATION FILED MAY 25, 1907.

1,135,950.

Patented Apr. 13, 1915.
5 SHEETS—SHEET 1.

WITNESSES

INVENTOR

R. F. McFEELY.
MACHINE FOR USE IN THE MANUFACTURE OF BOOTS AND SHOES.
APPLICATION FILED MAY 25, 1907.

1,135,950.

Patented Apr. 13, 1915.
5 SHEETS—SHEET 2.

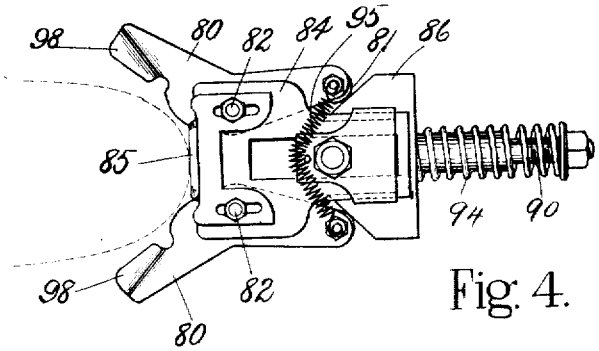
Fig. 4.
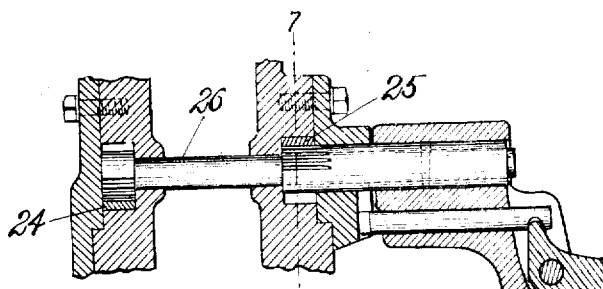
Fig. 5.
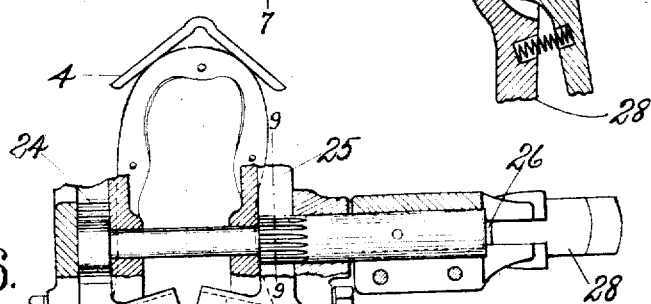
Fig. 6.
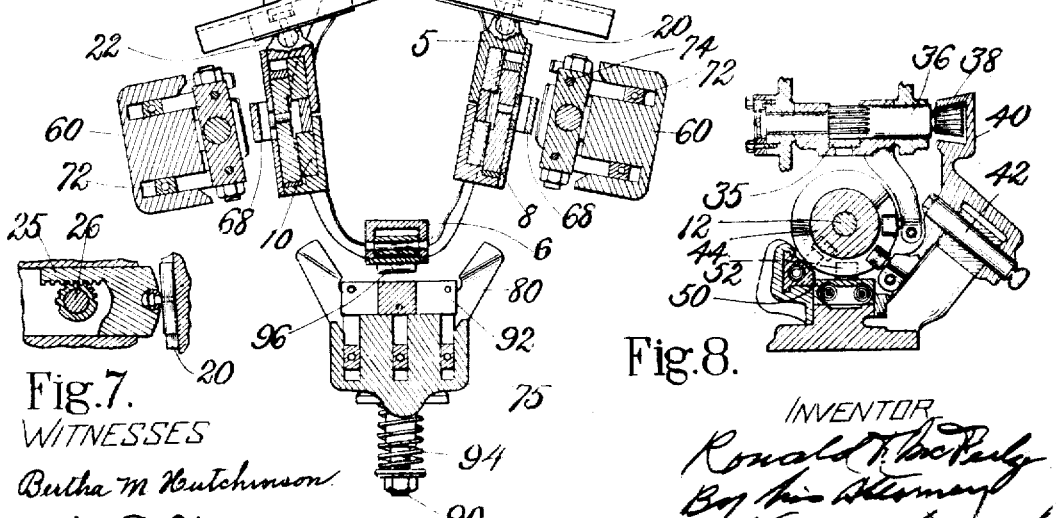
Fig. 7.
Fig. 8.

R. F. McFEELY.
MACHINE FOR USE IN THE MANUFACTURE OF BOOTS AND SHOES.
APPLICATION FILED MAY 25, 1907.

1,135,950.

Patented Apr. 13, 1915.
5 SHEETS—SHEET 4.

WITNESSES.
Bertha M. Hutchinson
Meta B. Stevens

INVENTOR
Ronald F. McFeely

R. F. McFEELY.
MACHINE FOR USE IN THE MANUFACTURE OF BOOTS AND SHOES.
APPLICATION FILED MAY 25, 1907.

1,135,950.

Patented Apr. 13, 1915.
5 SHEETS—SHEET 5.

WITNESSES.
Bertha M. Hutchinson.
Meta B. Stevens

INVENTOR.
Ronald F. McFeely
By his Attorney,
Nelson E. Howard

UNITED STATES PATENT OFFICE.

RONALD F. McFEELY, OF BEVERLY, MASSACHUSETTS, ASSIGNOR TO UNITED SHOE MACHINERY COMPANY, OF PATERSON, NEW JERSEY, A CORPORATION OF NEW JERSEY.

MACHINE FOR USE IN THE MANUFACTURE OF BOOTS AND SHOES.

1,135,950.   Specification of Letters Patent.   Patented Apr. 13, 1915.

Application filed May 25, 1907. Serial No. 375,669.

*To all whom it may concern:*

Be it known that I, RONALD F. McFEELY, a citizen of the United States, residing at Beverly, in the county of Essex and Commonwealth of Massachusetts, have invented certain Improvements in Machines for Use in the Manufacture of Boots and Shoes, of which the following description, in connection with the accompanying drawings, is a specification, like reference characters on the drawings indicating like parts in the several figures.

This invention relates to the manufacture of boots and shoes and particularly to a machine for use in working an upper into position upon the last over which the shoe is made. Letters Patent of the United States No. 663,777, granted upon my application filed September 19, 1899, describes and claims a machine for pulling-over uppers.

The object of the present invention is to produce a machine which shall both pull over the upper and also perform the subsequent operation of working the upper into lasted position.

In my co-pending application Serial No. 372,055 I have described and claimed broadly a machine for automatically pulling-over a shoe and then lasting the shoe. A very important feature of this invention consists in the combination with means for pulling an upper over a last, of automatically operated, or power operated, means for working the upper into lasted position.

A more specific feature of this invention consists in the combination with means for automatically gripping an upper at a plurality of points and pulling it, which means will preferably be constructed and arranged for movement to adjust the pulled upper about the last, of means for automatically lasting the upper, or lasting the upper by devices operated by the power driving mechanism of the machine as distinguished from the hand operated wipers of said co-pending application. In the illustrated embodiment of the invention the shoe is pulled-over and lasted while it remains in substantially the same position in the machine, but the invention is not limited in this respect. As herein shown, the lasting means comprises wipers for forcing the upper into lasted position about the end and sides of the toe portion of the last in a single operation. The pulling-over mechanism embodied in the machine herein shown and described is similar to the pulling-over mechanism shown in said Letters Patent.

In this embodiment of the invention wiping mechanism corresponding to that employed in said pulling-over machine for overworking the upper on each side of the shoe is utilized for lasting the sides of the shoe. This mechanism preferably operates at substantially the same time as the toe lasting mechanism so that the forward portion of the shoe is lasted in one operation.

In accordance with another feature of the invention there is provided, in combination with the overworking mechanism, means, preferably operating automatically, or by power, for securing the pulled-over and lasted upper at the opposite sides of the ball of the shoe and at a plurality of points about the toe of the shoe in one operation. In the embodiment of the invention herein shown the upper is secured by tacks which hold it temporarily until the shoe is presented to the shoe sewing machine or other apparatus by which the upper is permanently fastened.

A further feature of the invention consists in novel end lasting mechanism comprising wipers which, engaging the shoe at the sides of the toe before the upper is wiped over at the end of the last, clamp the upper to the last and prevent the upper being crowded lengthwise of the shoe in any subsequent movement of the lasting mechanism and the last relatively for working the upper into lasted position.

Another feature of this invention is that the wipers, which may comprise the means for clamping the upper against the last as stated, are arranged to force the upper over the last bottom from its opposite sides by a movement inwardly toward the median line of the last without any substantial movement lengthwise of the last. The object of this arrangement is to prevent during the operation of lasting the toe the formation of fullness or wrinkles ahead of the wipers in an upper which has been properly positioned on a last in the pulling-over operation.

In the illustrated embodiment of the invention the wipers which are movable lengthwise of the last from an inoperative position removed from the shoe have their longitudinal movement automatically arrested when they reach an operative relation to the shoe. The wipers are then actuated toward each other into holding engagement with the upper at opposite sides of the shoe, clamping the upper to the last, and each wiper advances over the shoe bottom in a path which is approximately perpendicular to the median line of the last. In the construction shown this operative movement of the wipers takes place about pivots so located that each wiper swings from a position approximately in alinement with the adjacent edge of the last toward a position approximately parallel with the median line of the last bottom without any substantial displacement of the upper lengthwise of the shoe. Heretofore there has usually been employed with end lasting wipers an end embracing band which clamped the upper to the sides of the last and prevented the upper being pushed ahead by the wipers which were actuated lengthwise of the last while being closed. With the construction and arrangement of the end lasting mechanism herein shown a band is not necessary for this purpose. The wipers above described, which work the upper into lasted position at the " corners " of the shoe or the portions of the shoe between the sides and the end of the last, will be herein referred to as " corner wipers " to distinguish them from the " end wiper " and the " side wipers " which will be mentioned.

A further feature of this invention is that the upper is wiped over at the end of the last after it has been wiped over at the corners, so that the upper material from the end of the shoe is folded over the upper material from the corners of the shoe. This is done by actuating the corner wipers over the last bottom in advance of wiping over the upper from the end of the shoe. One advantage of this arrangement is that the formation of puckers or " ears " is obviated. These ears which will be produced if the upper is folded over at the end of the last first, form wrinkles in the sides of the shoe which are difficult to remove and they also constitute bunches in the overworked upper on the shoe bottom and are liable to obstruct the sewing apparatus to which the shoe, it is contemplated, will be presented after the pulling-over and lasting operation performed by the machine of this invention.

In the preferred construction herein shown the upper is worked over the last bottom at the end of the shoe by separate means herein referred to as the end wiper. The corner wipers and end wiper are, as herein illustrated, automatically moved into operative relation to the shoe and are automatically actuated to work the upper about the toe portion of the shoe into lasted position. In this embodiment of the invention these wipers are mounted upon a support by which they are carried toward the shoe from a position where they are out of the way during the pulling-over operation. The corner wipers are yieldingly mounted on the support in advance of the end wiper and are connected to a stop by which their movement lengthwise of the shoe is arrested. The corner wipers are also operatively connected with an actuator on the support and as the support continues in its movement the actuator effects the closing of the corner wipers into holding and then wiping engagement with the shoe. The end wiper is preferably far enough behind the corner wipers to allow the latter to commence the wiping in of the corners of the upper before the end wiper begins to bend the upper at the toe end of the last backwardly over the last bottom. In the completion of the movement of the support the wipers force the upper into lasted position about the entire toe portion of the last, the upper from the corners being folded under the upper from the end of the shoe.

It is a feature of this invention that the end wiper is located in a plane above the corner wipers. This arrangement facilitates the folding of the upper by this wiper over the upper folded in by the corner wipers and allows the end wiper to overlie the corner wipers.

In the construction shown the end wiper includes, or is provided with, tack holders from which tacks are inserted at a plurality of points suitably located to hold in lasted position the overworked upper folded as described. The corner wipers are recessed to permit the tacks to be driven into portions of upper firmly held by them. The upper at the sides of the shoe is also secured at the same time by tacks driven in the region of the side wipers. It will now be understood that, in the machine shown, the end, corner, and side wipers coöperate and are automatically actuated to work the upper into lasted position about the entire forward portion of the shoe, and that the upper is secured at the sides of the shoe and at a plurality of points at the toe of the shoe in the same operation.

In the illustrated embodiment of the invention the devices, including the toe embracing wipers, that work upon the shoe are mainly arranged overhead with relation to the shoe and the machine is open below and in front of said working devices so that free access is provided to permit the shoe to be presented from the front and below said overhead working devices. This arrangement is of advantage because it affords convenience in the presentation of the shoe and clearance for inspection and manipulation in placing the upper in proper relation to the devices that are to engage it. Also, as herein shown, the shoe is seized by the machine after it has been properly positioned and is thereafter held by the machine so that the operator can withdraw his hands and have them free for other uses.

This invention combines advantages of the hand method type of lasting machine and also those of the bed type of laster in that the time-consuming operation of jacking is rendered unnecessary and yet the shoe is handled automatically by the machine during the operation and is held firmly to receive the action of the overworking devices thereon.

The features of the invention above explained and others, including certain details of construction and combinations of parts, will be explained in the following description and pointed out in the claims, except as to the improvements in methods of making shoes which improvements are included in the subject-matter of application Ser. No. 386,572, filed August 1, 1907.

The machine in which the invention is herein shown is the same in its general organization and in most of the mechanisms concerned in the pulling-over operation and also in the tack-driving operation, as well as in the stopping and starting mechanism, as the machine which is fully illustrated and described in prior patents. These patents include particularly said Letters Patent No. 663,777 and No. 1,029,387 which describes the heel rest mechanism of the present machine. In view of these prior patents on this machine only those parts of the machine are herein shown and explained in detail which are directly concerned with this later invention, together with those mechanisms the operations of which it is necessary to consider definitely in order to understand the present invention.

Figure 2:
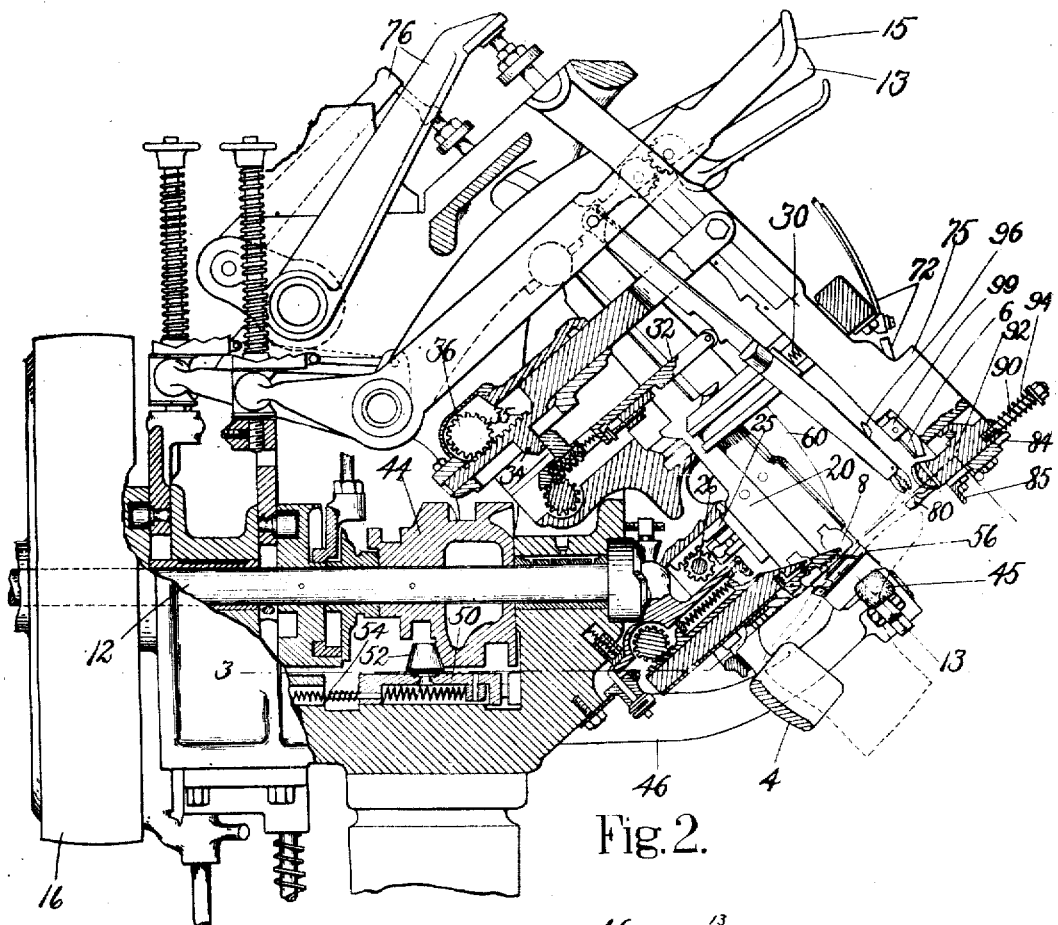
Figure 3:
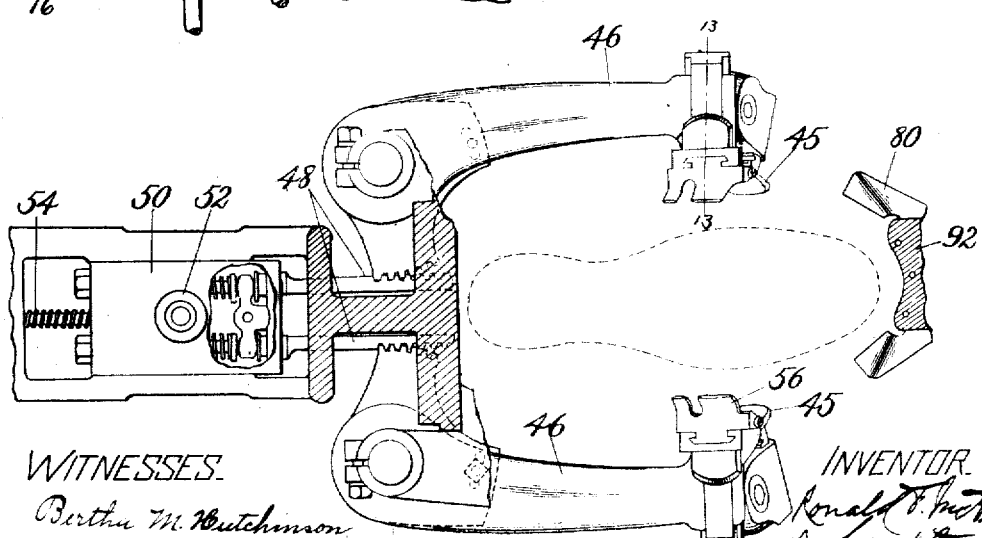
Figure 9:
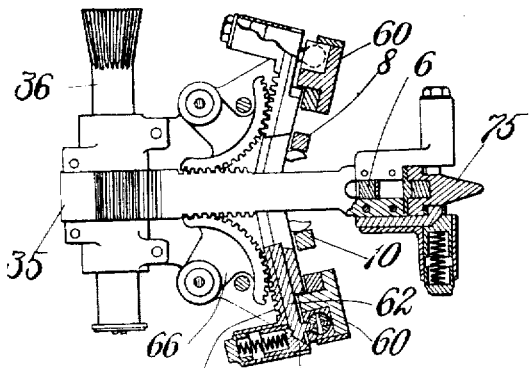
Figure 10:
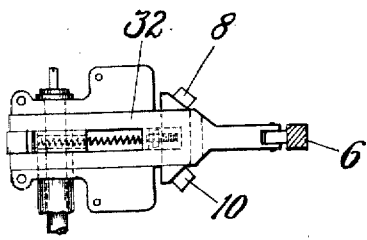
Figure 11:
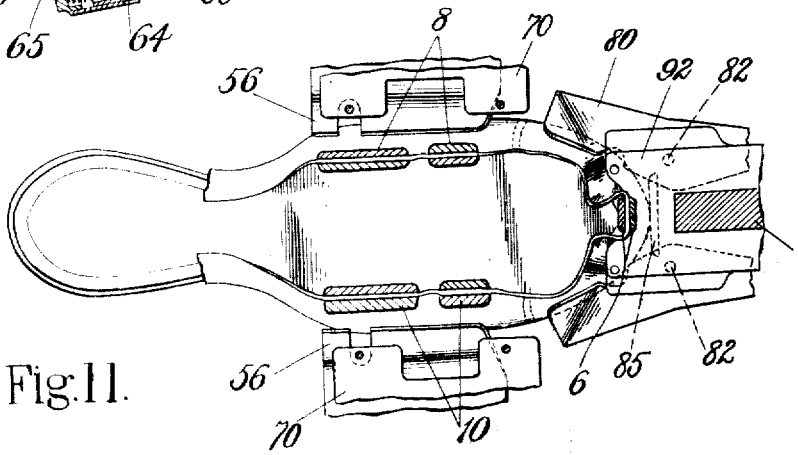
Figures 12, 13:
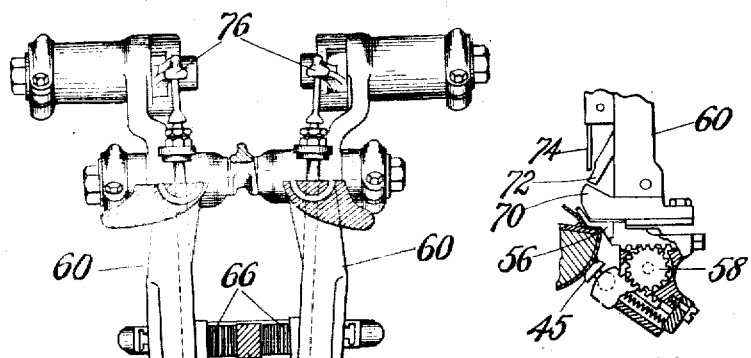
Figure 14:
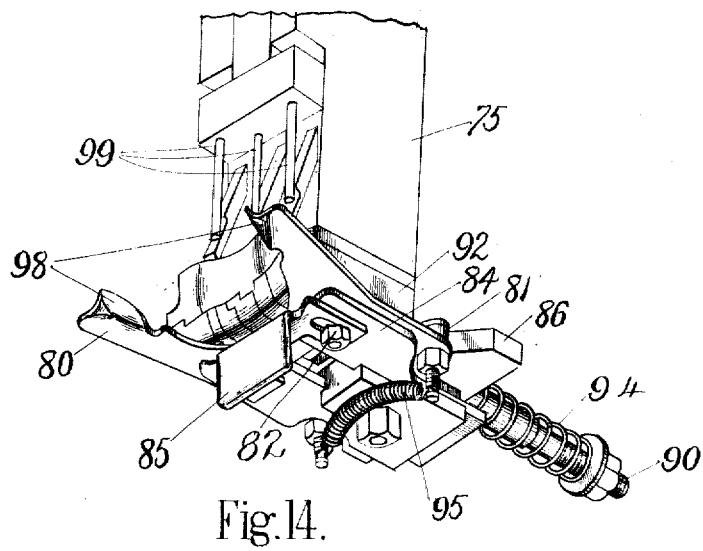
Figure 15:
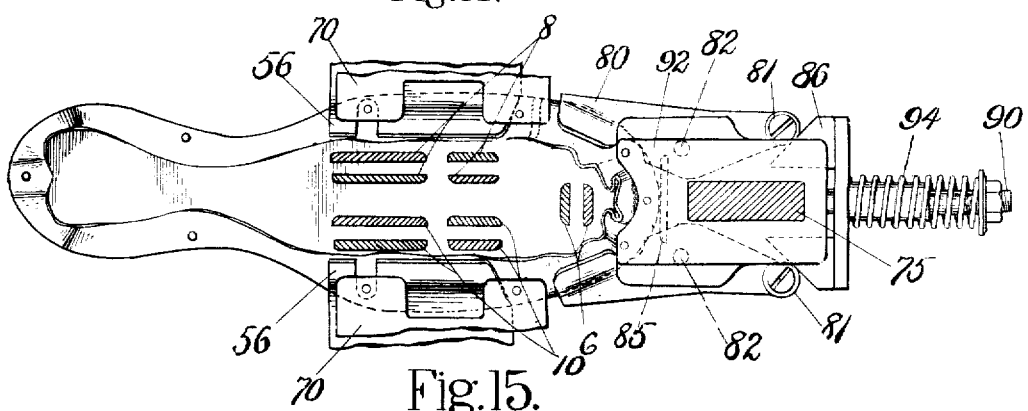
Figure 16:
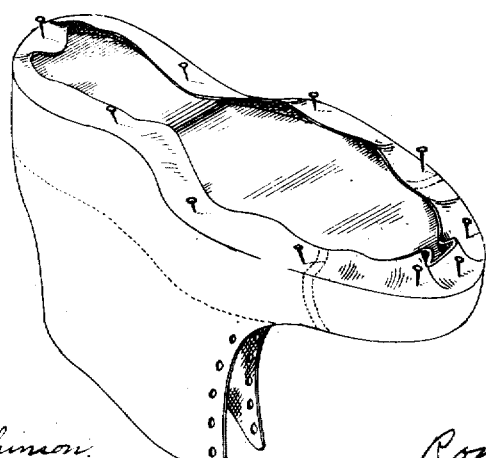

In the drawings, Figure 1 is a side elevation, partly in section, of a machine embodying the invention in the best form now known to me. Fig. 2 is a vertical longitudinal section. Fig. 3 is a section on the line 3—3, Figs. 1 and 2. Fig. 4 is a bottom plan view of the toe lasting mechanism. Fig. 5 is a section on line 5—5 of Fig 1. Fig. 6 is a section on approximately line 6—6 of Fig. 1. Fig. 7 is a section on approximately line 7—7 of Fig. 5. Fig. 8 is a section on approximately line 8—8 of Fig. 1. Fig. 9 is a plan view, partly in section, of the means for moving the tack-driving mechanisms inwardly and outwardly. The plane in which this figure is taken is indicated by the line 9—9 on Fig. 1. Fig. 10 is a plan view from the plane of the line 10—10, Fig. 1, showing the mechanism for controlling the inward movements of the grippers. Fig. 11 is a plan view, the grippers being shown in section, of parts which may be seen from the plane indicated by the line 11—11 in Fig. 1. This figure shows the position of the several mechanisms and the condition of a turn shoe after the pulling-over operation has been completed and when the lasting devices are about to force the upper into lasted position. Fig. 12 is a front elevation showing the last supporting devices and shoe clamping devices and the tack-driving mechanism operating at the sides of the shoe. Fig. 13 is a section of a last support and side wiper on line 13—13 of Figs. 2 and 3. Fig. 14 is a perspective view of the tack-driving mechanism which operates at the toe of the shoe, and also shows the toe lasting mechanism, which is mounted on the same support as the tacking mechanism. Fig. 15 is a plan view similar to Fig. 11, showing the condition of the shoe and the relative position of the several mechanisms when the lasting operation has been completed and the shoe is ready to receive the tacks for fastening the upper. Fig. 16 is a perspective view of a turn shoe pulled-over and lasted by the machine.

The machine comprises a bottom rest 2, and a heel rest 4, with relation to which the shoe is positioned, as shown in Fig. 1, with its bottom face upward in a plane at an oblique angle to the vertical so that the fore part of the shoe is readily observable by a workman standing in front of the machine.

The upper is engaged by grippers 6, located at the toe of the shoe, and grippers 8 and 10 arranged at opposite sides of the fore part of the shoe. The grippers 8 and 10 may consist of two pairs of jaws, as best illustrated in Figs. 11 and 15. The several grippers are automatically closed to grip the upper, and then uplifted to pull the upper by yielding mechanism shown in said Letters Patent which connects the grippers with the driving shaft 12. This mechanism includes levers 13, 14 and 15, the front ends of which are formed as handles, by means of which the grippers may be manually moved for adjusting the upper with relation to the last after they have automatically gripped the upper and while they are holding it under tension.

The driving shaft is connected to the driving pulley 16 by a clutch mechanism, which may be of any suitable construction, for example, that showing in United States Letters Patent No. 791,986, for causing the shaft to stop after having actuated the grippers to pull the upper on the last. During ensuing rest in the machine's operation, the workman has opportunity to examine the shoe and see if the upper is correctly positioned upon the last. If the upper needs to be adjusted transversely about the last, this can be done by manually manipulating the handled levers 13 and 14, as, for example, by depressing one of them and raising the other. If the upper needs to be adjusted longitudinally around the last to arrange it properly, as is sometimes necessary, for example to straighten or position the toe tip seam which should have the same position in each one of a pair of shoes, the side grippers 8 and 10 may be manipulated for this purpose. These grippers are pivotally connected to their levers 13 and 14 for movement lengthwise of the last. In the construction shown, they are also connected with mechanism by which they may be definitely moved for adjusting the upper longitudinally around the last. The shells or casings 20 and 22 of the side grippers are connected as shown in Fig. 6 by universal joints with toothed bars 24 and 25. The bar 24 extends under a shaft 26, and is engaged by a pinion on the left-hand end of said shaft. The bar 25 extends over the shaft 26, and is engaged by teeth formed on a sleeve which is secured to the shaft 26. The shaft is provided with a handle 28, by which it may be turned. It will now be understood that through the connections described the side grippers may be moved together in opposite directions, whereby the upper may be shifted longitudinally around the last in either direction.

The grippers are mounted for swinging movement inwardly from their gripping position whereby they may draw the upper over the last bottom. They are pressed inwardly by springs suitably arranged with relation to each gripper, one of which springs is shown at 30 bearing upon the toe gripper in Figs. 1 and 2. The grippers are held spread apart in their gripping position by a slide 32, shown in Figs. 1, 2 and 10, the end of which rests against the toe gripper while the inclined side faces engage the side grippers. The slide 32 is maintained in its outer position as shown in Fig. 1 by the engagement with a lug 34 on a toothed slide 35 which is movable forwardly and backwardly by a toothed shaft 36. This shaft, which is shown in Figs. 8 and 9 as well as in Fig. 1, has engagement with a rack bar 38 on the upper arm of a lever 40 pivoted at 42 and having a roll on its lower arm which stands in a groove in a cam block 44 on the main shaft 12. This groove is so formed that the grippers controlling slide is not actuated during the first portion of the rotation of the shaft but is retracted when the machine is started a second time, thus allowing the springs 30 to force the grippers inwardly for carrying the pulled and adjusted upper over the last bottom.

Last supports 45, shown in Figs. 12 and 13, are carried on horizontally swinging arms 46, by which they are held away from the shoe during the operation of pulling the upper and adjusting it about the last. The arms are formed as bell crank levers, and their short, rear, inwardly turned ends are engaged by rack bars 48, yieldingly connected to a block 50, which carries a roll 52, held by a spring 54 in engagement with a cam face of the cam block 44 on the shaft 12. The cam face is formed to actuate the levers 46 for moving the last supports into position to sustain the shoe as the slide 32 is retracted to allow the grippers to draw the upper over the last bottom.

The levers 46 carry devices 56 which, in the construction shown, have the function of wiping the upper at the sides of the shoe inwardly over the innersole. These "side wipers", as they will be herein called, may be of any suitable construction, and are shown as provided at their inner edges with upwardly inclined faces, adapted, as they engage the last, to clamp the upper against the angular edge of the last, and then, continuing their movement, force the upper over the shoe bottom into lasted position and hold it until it is fastened to the sole. The side wipers are shown as mounted for sliding movement in the upper face of the levers 46, and each wiper is provided with teeth in engagement with a pinion 58, which also engages teeth on the stem of the adjacent last supporter 45.

The fastening of the upper at the sides of the shoe is effected by tack carrying and driving mechanisms, which are shown most clearly in Fig. 12. These mechanisms comprise arms 60, mounted for swinging movement from inoperative positions laterally removed from the sides of the last into operative positions over the shoe bottom. This movement of the arms is effected by mechanism connected with the slide 35 before mentioned. The arms 60 are each connected to a sliding plate 62, as shown in Fig. 9, and the plate in turn connected by a spring-pressed plunger 64 with a rack 65. Each rack is engaged by a segment 66, which meshes with teeth formed on the opposite edges of the slide 35. It may be here explained that the side grippers in their movement inwardly over the last bottom, are followed closely by the tacking mechanisms which engage and actuate tripping devices 68 on the side grippers, causing the grippers to open sufficiently to release the upper. The grippers construction by which this operation is effected may be the same as that shown in Letters Patent, No. 663,777. The side wipers carried by the levers 46 follow the grippers in advance of the tack holders 70 on the arms 60 of the tacking mechanisms and said wipers come into operative engagement with the upper before the grippers release it.

The tacks, which are delivered by the tubes 72 from suitable tack supplying mechanism to the tack holders are inserted by the drivers 74 which are actuated by spring-controlled arms 76 automatically released at the proper time for driving the tacks by suitable tripping mechanism, not necessary to describe.

An arm 75, similar to the arms 60, is arranged at the front of the machine in position to be moved, by a connection with the slide 35 shown in Fig. 9, lengthwise of the last from a position in front of the toe end of the shoe to a position over the toe of the shoe. The lasting mechanism for forcing the upper into lasted position about the toe of the shoe is, as herein illustrated, mounted upon arm 75 and actuated automatically during the movement of said arm toward the shoe.

This lasting mechanism, which is shown in bottom plan in Fig. 4 and in perspective in Fig. 14, comprises wipers 80, each pivotally connected by a bolt 82 to a slide 84 which is connected to the arm 75 to permit relative movement of the arm and wipers lengthwise of the shoe.

Adjustably attached to the slide 84 is a stop or abutment 85, located between the wipers, and depending below them into position to contact with the end face of the shoe as the arm swings inwardly. The arm 75 also carries a wedge block 86, having oppositely inclined edges, which are engaged by the tails of the wipers 80 or by rollers 81 mounted on said wipers. The wedge block separates the tails and forces the wipers toward each other as the abutment 85 strikes the shoe and arrests the inward movement of the wipers, it being understood that the arm and wedge block continue to advance. The wedge block may be yieldingly connected to the arm 75, and, as shown, is formed as a slide mounted on stud 90 projecting rearwardly from the tack holder 92 which is carried on the lower end of the arm 75. A spring 94 is interposed between the rear side of the wedge block and a collar of the stud 90 and permits the wedge block to yield rearwardly if the wipers encounter unusual resistance to their inward movement. The wipers are opened and the tails held in contact with the wedge block by a spring 95.

The wipers 80 herein called corner wipers are so arranged that they engage and wipe over the upper at the corners of the last. They are thin plates and the tack holder 92 is arranged immediately above the wipers and constitutes, in effect, an intermediate wiper acting at the end of the toe and will be sometimes referred to as the end wiper.

From the foregoing description of the toe lasting mechanism, it will be understood that, in the inward movement of the arm 75, the abutment 85 engages the end of the shoe and arrests the forward movement of the corner wipers. As the arm continues its movement, the wedge block 86 causes the corner wipers to turn about their pivots 82 and move inwardly over the last bottom.

An important characteristic of this construction is that the wipers 80 do not travel lengthwise of the last during their closing movement, but swing inwardly about the pivotal points, which are stationary during this movement. This causes the wipers to force the upper over the last bottom by a movement transverse to the last, thus avoiding any tendency which the wipers might otherwise have to push the upper lengthwise of the last during the closing movement.

The intermediate wiper, formed by the tack holder, continues uninterruptedly its movement with the arm 75, and it is so arranged with relation to the corner wipers that it does not contact with the upper for forcing it over the last bottom until the corner wipers have folded or partially folded the upper inwardly at the corners of the last. The result of this relative movement of the corner wipers and the intermediate wiper in folding the upper over the last bottom is seen in Figs. 11, 15 and 16. By comparing the positions of the upper in these figures, it will be understood that the corner wipers first fold inwardly the upper at the corners of the last, and thereafter the intermediate wiper folds the upper from the toe end of the last inwardly over the upper from the corners of the last.

The toe gripper moves inwardly over the shoe bottom simultaneously with the side grippers and the tacking mechanism for the toe moves with the side tacking mechanism.

The arm 75 engages and actuates the tripping device 96 which causes the toe gripper to release the upper, but preferably the parts are arranged relatively so that the corner wipers come into holding engagement with the upper and begin to force it into lasted position before the grippers release their hold upon the upper. This relation is illustrated in Fig. 11 wherein it may be seen that the corner wipers as well as the side wipers have come into operative holding engagement with the upper while the grippers are still holding it. The corner wipers are preferably provided with upturned ends forming inclined faces 98 which first engage the shoe. The inclined faces of the side and corner wipers enable them to ride over lasts supported at slightly different altitudes Preferably the parts will be arranged so that the inclined faces will clamp the upper against the edge of the last and their movement then be arrested while their actuating mechanisms, (including the spring connection between the rack bars 48 and block 50 of the side wiper mechanism and the spring 94 of the corner wiper mechanism) are put under tension. Then when the grippers release the upper said inclined faces wedge the shoe downwardly, the supports 45 yield and allow the wipers to advance quickly for forcing the upper over the sole into lasted position.

The tack holder 92 is arranged, as herein shown, to contain three tacks, disposed as shown in the drawings, which are driven by a multiple driver 99 for fastening the upper at the toe end and the corners of the last in lasted position to which said portions of the upper are forced by the intermediate and corner wipers. The tack holders 70, at the sides of the last, are adapted, as shown in the drawings, for fastening the upper at the sides of the shoe in the lasted position to which said portions of upper are forced by the side wipers 56.

In the use of the machine the operator presents an assembled shoe in the position shown in Figs. 1 and 2. The shoe is herein represented as a turn shoe, although of course the invention is not limited to machines for use on any particular type of shoe. When the upper has been placed within the open grippers the machine is started, whereupon the grippers close and are uplifted to pull the upper about the last. The machine then automatically comes to rest and opportunity is given for the workman to adjust the upper about the last by moving the side grippers for adjusting the upper longitudinally or transversely of the last as may be required by moving the side grippers. When the machine is started again the arms 46 are actuated to move the last supports 45 into operative supporting engagement with the shoe. At the same time the grippers and also the arms 60 and 75 swing inwardly toward the position of the parts shown in Fig. 11. In this movement of the several mechanisms the side wipers 56 and the end lasting mechanism are moved toward operative engagement with the shoe. Preferably the parts are arranged so that the corner wipers 80 of the end lasting mechanism are the first to engage the work and they clamp the upper against displacement lengthwise of the last during the lasting operation. The several wipers then advance over the shoe bottom, forcing the upper into lasted position and causing the grippers to be opened. The final inward position of the several parts is shown in Fig. 15 and it is when the wipers are in this position that the tack-driving mechanisms insert tacks for securing the upper at the opposite sides of the shoe and at the several points about the toe of the shoe. After the insertion of the tacks the several parts of the mechanism return to their starting positions shown in Figs. 1 and 2 and the completed shoe, such as shown in Fig. 16, is discharged from the machine.

By the expression "pulling-over" as used in the foregoing description and in the claims is meant that operation which was in earlier times performed by hand pullers and which at present is very generally practised by the use of a pulling-over machine of the type shown in United States Letters Patent No. 663,777 and which includes pulling the upper of an assembled shoe into general conformity with the contour of the last and into suitable position thereon with its lines, such as the tip seam and the lace opening, in the desired relation to the last preparatory to lasting the shoe.

Having explained the nature of this invention and described a machine embodying the invention in the best form now known to me, I claim as new and desire to secure by Letters Patent of the United States:—

1. In a machine of the class described, the combination with means for pulling-over a shoe, said means being constructed and arranged to permit relative movement of the upper and the last to stretch the upper and additional movement of the upper and the last relatively to position the upper in proper relation to the last for lasting, of power operated means for lasting the toe portion of the shoe.

2. In a machine of the class described, the combination with means for pulling-over a shoe including provision for adjusting the upper and the last relatively, of power operated means for lasting the entire toe portion of the shoe in a single operation.

3. In a machine of the class described, the combination with means for pulling-over a shoe, of power operated means for working the upper into lasted position at a plurality of points in the same operation of the machine and means adjustable laterally of the shoe to afford support for the heel and faces of right and left shoes on crooked lasts the foreparts of which are similarly positioned relatively to the lasting means.

4. In a machine of the class described, the combination with means for pulling-over a shoe, said means being constructed and arranged to permit relative movement of the upper and the last to stretch the upper and for additional movement of the upper and the last relatively to position the upper in proper relation to the last for lasting, of power operated means for working the shoe around the toe into lasted position, and means for securing the upper in lasted position.

5. In a machine of the class described, the combination with means for pulling-over a shoe, of power operated mechanism for lasting and securing the toe portion of the upper and a heel rest adjustable transversely of the machine to support right and left crooked shoes the foreparts of which are similarly positioned relatively to the lasting and securing mechanism.

6. In a machine of the class described, the combination with means for pulling-over a shoe, of means for lasting the toe portion of the shoe, and power operated mechanism for securing the upper in lasted position.

7. In a machine of the class described, the combination with means for pulling-over a shoe including provision for adjusting the upper and the last relatively, of power operated wiper mechanism for working the upper into lasted position about the toe of the shoe.

8. In a machine of the class described, the combination with means for pulling-over a shoe, of connected wipers arranged to act on the opposite corners of the toe and power operated means for actuating said wipers to force the upper into lasted position.

9. In a machine of the class described, the combination with means for pulling-over a shoe, of power operated mechanism for lasting the end and corners of the toe of the shoe and securing the upper at a plurality of points.

10. In a machine of the class described, the combination with grippers for pulling an upper on a last, and means for relatively moving the grippers and last to adjust the upper about the last, of power operating means for lasting the toe portion of the shoe.

11. In a machine of the class described having grippers for pulling an upper on a last and constructed and arranged to permit relative movement of the grippers and the last to adjust the upper about the last, the combination with power operated means for working the upper into lasted position about the toe portion of the last, of power operated means for securing the upper.

12. In a machine of the class described, the combination with grippers for pulling an upper on a last, and means for relatively moving the grippers and last to adjust the upper about the last, of power operated means constructed and arranged for working the upper into lasted position at the corners and end of the toe of the last in the same operation.

13. In a machine of the class described, the combination with means for pulling-over a shoe, of means for lasting the toe portion of the shoe constructed and arranged to force the upper into lasted position at the corners of the toe in advance of the upper forced inwardly from the end of the toe.

14. In a machine of the class described, the combination with means for pulling-over a shoe, of means for lasting the toe portion of the shoe constructed and arranged to fold the upper from the end of the toe of the shoe over the upper folded inwardly from the opposite corners of the toe of the shoe.

15. In a machine of the class described, the combination with means for pulling-over a shoe, of means for lasting the toe portion of the shoe constructed and arranged to force the upper into lasted position at the corners of the toe in advance of the upper forced toward lasted position from the end of the toe, and means for inserting separate fastenings to secure the upper at the end and the corners.

16. In a machine of the class described, the combination with means for pulling-over a shoe, of power operated mechanism for working the upper into lasted position about the toe portion of the shoe, and other mechanisms for forcing the upper over the last at opposite sides of the shoe.

17. In a machine of the class described, the combination with power operated means for pulling-over a shoe, said means including grippers constructed and arranged for movement to adjust the upper about the last, and means for stopping the machine after the upper is pulled, of means for automatically working the toe portion of the upper into lasted position when the machine is again started.

18. In a machine of the class described, the combination with means for pulling-over a shoe, said means including grippers arranged to engage the upper at opposite sides of the shoe and a gripper arranged to engage the upper at the toe of the shoe, and relatively movable wipers arranged to act on the upper adjacent to the toe gripper and at opposite sides thereof, of power operated mechanisms for actuating the grippers and the wipers.

19. In a machine of the class described, the combination with a gripper arranged to engage the upper at the toe of a shoe, wipers arranged to act on the upper adjacent to the gripper and at opposite sides thereof, and power operated means for actuating the gripper to pull the upper, said actuating means having provision for causing automatically a rest in the machine's operation after the gripper has pulled the upper, of power operated means for actuating the wipers to force the upper into lasted position when the machine is again started.

20. In a machine of the class described, the combination with means for pulling-over a shoe, of power driven means for lasting the shoe around the toe while it remains in substantially the same position occupied by it during the pulling-over operation, and means for resting against the backward thrust of said lasting means the differently located heel portions of shoes on right and left crooked lasts, the foreparts of which are similarly positioned relatively to the lasting means.

21. In a machine of the class described, the combination with means for pulling an upper about a last, of mechanism for working the upper into lasted position about the toe portion of the shoe, other mechanism for forcing the upper over the last at opposite sides of the shoe, and power operated mechanisms for securing the upper in over-worked position at the toe and sides of the last.

22. In a machine of the class described, the combination with means for pulling-over a shoe, including means permitting relative adjustment of the upper and last, of power operated means constructed and arranged for thereafter lasting the forward portion of the shoe at a single operation.

23. In a machine of the class described, the combination with means for pulling-over a shoe, of power operated operating means for lasting the forward portion of the shoe during the continued operation of the machine, and means movable into position for resting against the backward thrust of the forepart lasting means, the differently positioned rear portions of shoes on right and left crooked lasts the foreparts of which are positioned similarly relatively to the said lasting means.

24. In a machine of the class described, the combination with power driven operating means for pulling an upper about a last, said means being constructed and arranged to permit movement for adjusting the upper about the last while under pulling strain, of power operated means for thereafter lasting the toe portion and adjacent side portions of the shoe.

25. A machine of the class described having power driven means for pulling-over a shoe, means for thereafter effecting a rest in the machine's operation, and power operated means for lasting the toe portion of the shoe when the machine is again started.

26. In a machine of the class described, the combination with means for pulling-over a shoe, of power operated mechanism including relatively movable wipers for working the upper into lasted position about the toe of the shoe, and means for wiping the upper over the last bottom at the opposite sides of the ball of the shoe in the same operation.

27. In a machine of the class described, means for updrawing the toe portion of an upper and holding it under tension combined with relatively movable end lasting members constructed and arranged to force the upper over the last bottom at the end of the toe of the last and to force the upper over the last at the corners of the toe of the last in advance of the upper forced over the last bottom from the end of the toe.

28. In a machine of the class described, end lasting mechanism comprising relatively movable wipers for engaging the upper at the opposite corners of the toe of the last and a wiper for engaging the upper at the end of the last, said corner wipers being constructed and arranged for movement first lengthwise of the last into operative position and then transversely of the last to act upon the upper in advance of the end wiper.

29. In a machine of the class described, end lasting mechanism comprising relatively movable wipers having clamping faces at their ends and constructed and arranged to clamp the upper against the edge of the last in advance of the engagement therewith of their intermediate wiping faces and operating to hold the upper against movement along the edge of the last while the upper is being forced into lasted position upon the last bottom.

30. A machine of the class described having, in combination, means for positioning a shoe with its sole face uppermost and at an oblique angle to the vertical, said machine being arranged to permit a substantially unobstructed view of the forepart of the shoe by the operator, means for seizing the upper at the forepart of the shoe, pulling it and holding the upper under tension for inspection, and power operated means for lasting a continuous section of the forepart of the upper extending from one side of the toe around the end of the toe to the other side.

31. A machine of the class described having, in combination, means for positioning a shoe to permit a substantially unobstructed view of the forepart of the shoe by the operator, means for seizing the upper at the forepart of the shoe, pulling it and holding the upper under tension for inspection, connected toe embracing members, and power operated mechanism for actuating said members to wipe into lasted position; a continuous section of the forepart of the upper extending from one side of the toe around the end of the toe to the other side, said pulling means including means adapted to continue the upper under tension while the wiping means is moved into operative engagement with the upper.

32. A machine of the class described having, in combination, means for positioning a shoe, means for seizing the upper at the forepart of the shoe, pulling it and holding the upper under tension for inspection, and power operated means for lasting a continuous section of the forepart of the upper extending from one side of the toe around the end of the toe to the other side, said pulling means including a toe gripper responsive to manual control to change the tension on the upper preparatory to the operation of the lasting means and to maintain the toe portion of the upper under tension until the lasting means assumes control of the upper.

33. A machine of the class described having, in combination, means for positioning a shoe, means for seizing the upper at the forepart of the shoe, pulling it and holding the upper under tension for inspection, means for adjusting the upper and the last relatively to position the shoe correctly on the last, and power operated means for lasting a continuous section of the forepart of the upper extending from one side of the toe around the end of the toe to the other side, said lasting means including wipers mounted to permit them to be advanced into holding engagement with the tensioned upper preparatory to the release of the toe pulling means and to be advanced for laying the upper into lasted position after the upper has been released from the pulling means.

34. In a machine of the class described, power driven mechanism for clamping an upper against the edge of a last first at the corners only of the shoe and then, while holding the corners forcing the upper transversely of the last bottom from the sides of the shoe and lengthwise of the last bottom from the end of the shoe to work it into lasted position.

35. In a machine of the class described, end lasting mechanism comprising opposed wipers and means for causing the wipers to force the upper inwardly over the last bottom, said mechanism including inclined faces on the wipers for clamping the upper against the edge of the last in the region of the ends of the wipers to hold the upper against movement lengthwise of the edge of the last.

36. In a machine of the class described, the combination with means for supporting a shoe in inverted position, having provision for allowing the shoe to be depressed, of end lasting mechanism comprising wipers having inclined inner faces arranged for clamping the upper against the edge of the last, and means for forcing the wipers against the last whereby the shoe is wedged downwardly by said inclined faces as the wipers ride inwardly over the last bottom.

37. In a machine of the class described, the combination with grippers for pulling an upper at the opposite sides of the last and at the toe of the last, a bottom rest, and means for yieldingly upholding the last against the bottom rest, of end lasting mechanism comprising wipers having inclined inner faces constructed and arranged to clamp the upper against the edge of the last while the grippers are holding the upper under tension, means for releasing the grippers, and means for actuating the wipers to depress the last and ride over the last bottom to force the upper into lasted position.

38. In a machine of the class described, the combination with grippers for pulling an upper at the opposite sides of a last and at the toe of the last, and a bottom rest, of end lasting mechanism comprising wipers having inclined inner faces constructed and arranged to clamp the upper against the edge of the last while the grippers are holding the upper under tension, other wipers having inclined inner faces for clamping the upper against the edge of the last at the ball of the shoe, means located on opposite sides of the last between the wipers for yieldingly supporting the shoe, means for releasing the grippers, and mechanisms for actuating the wipers to depress the shoe and ride over the last bottom for forcing the upper into lasted position, said supporting means being arranged to allow the last to rock for equalizing the pressure of the wipers.

39. In a machine of the class described, end lasting mechanism comprising means for wiping the upper at the corners of the last inwardly over the last bottom and means constructed and arranged for subsequently wiping over the upper at the end of the last.

40. In a machine of the class described, end lasting mechanism comprising means for wiping the upper at the corners of the last inwardly over the last bottom and means located in a higher plane for subsequently wiping the upper at the end of the last over the upper wiped in by the corner wipers.

41. In a machine of the class described, end lasting mechanism comprising means for wiping the upper at the corners of the last inwardly over the last bottom and an end wiper located between the corner wipers in position to ride over the corner wipers, said parts being constructed and arranged to cause the end wiper to act subsequently to the operation of the corner wipers.

42. In a machine of the class described, end lasting mechanism comprising means for wiping the upper at the corners of the last inwardly over the last bottom, and an end wiper located between the corner wipers in a plane to ride over the corner wipers, said parts being constructed and arranged to cause the corner wipers to act in advance of the end wiper, combined with tack holders carried by the end wiper, and tack driving means.

43. In a machine of the class described, end lasting mechanism comprising means for wiping the upper at the corners of the last inwardly over the last bottom and an end wiper located between the corner wipers in a plane to ride over the corner wipers, said parts being constructed and arranged to cause the corner wipers to act in advance of the end wiper, combined with tack holders carried by the end wiper and arranged to support tacks over the corner wipers, and means for driving the tacks from the holders through openings in the corner wipers.

44. In a machine of the class described, end lasting mechanim comprising an actuator and opposed wipers operatively connected to the actuator and constructed and arranged to be moved first forwardly to positions opposite the corners of the toe of the shoe and then without substantial further forward movement to be closed inwardly over the last bottom in lines approximately perpendicular to the median line of the last bottom.

45. In a machine of the class described, end lasting mechanism comprising opposed wipers arranged to embrace the end portion of a shoe, means for actuating the wipers transversely over the shoe bottom, and means for effecting forward movement lengthwise of the shoe before the transverse movement begins and for restraining the wipers from movement lengthwise of the shoe while moving transversely thereof.

46. In a machine of the class described, end lasting mechanism comprising opposed wipers, means for moving the wipers into operative relation to a shoe, an actuator for moving the wipers transversely over the shoe bottom, and means for preventing movement of the wipers lengthwise of the shoe during the transverse movement.

47. In a machine of the class described, end lasting mechanism comprising opposed wipers, means for moving the wipers into operative relation to a shoe, a stop operatively connected to the wipers and adapted to engage the end of a shoe to limit movement of the wipers lengthwise of the shoe, and other means for effecting movement of the wipers transversely of the shoe.

48. In a machine of the class described, end lasting mechanism comprising opposed wipers, means for moving the wipers into operative relation to a shoe, a stop operatively connected to the wipers and adapted to engage the end of a shoe to limit movement of the wipers lengthwise of the shoe, and means rendered operative automatically by the engagement of the stop with the shoe to effect movement of the wipers transversely of the shoe.

49. In a machine of the class described, end lasting mechanism including opposed wipers and automatically operating mechanism therefor comprising means for moving the wipers lengthwise of a shoe into operative relation thereto, means for arresting the said movement of the wipers, and means for actuating the wipers transversely of the shoe.

50. In a machine of the class described, the combination with opposed end lasting wipers and an intermediate wiper, of automatically operating mechanism including means for moving the opposed wipers lengthwise of the shoe into operative relation to the shoe, means for arresting said movement of the opposed wipers, and means for thereafter moving the opposed wipers transversely of the shoe while the intermediate wiper moves lengthwise of the shoe.

51. In a machine of the class described, end lasting mechanism comprising wipers, means for automatically actuating the wipers lengthwise of the shoe, means whereby the said movement of the wipers is arrested when they reach operative relation to the shoe, and means by which the wipers are thereafter moved inwardly toward the median line of the shoe without substantial movement lengthwise of the shoe.

52. In a machine of the class described, end lasting mechanism comprising pivoted wipers, means for automatically actuating the wipers lengthwise of the shoe, means whereby the said movement of the wipers is arrested when they reach operative relation to the shoe, and means by which the wipers are moved inwardly toward the median line of the shoe without substantial movement lengthwise of the shoe, the pivots for the wipers being located to cause each wiper to turn during its inward movement from a position approximately parallel with the adjacent side of the last to a position approximately parallel with the median line of the last bottom.

53. In a machine of the class described, end lasting mechanism comprising connected lateral wipers movable longitudinally of the last into operative position, and an intermediate wiper movable independently of the lateral wipers.

54. In a machine of the class described, end lasting mechanism comprising connected lateral wipers, an intermediate wiper, and actuating mechanism having provision for moving all the wipers together and for moving the lateral wipers and the intermediate wiper separately.

55. In a machine of the class described, end lasting mechanism comprising connected lateral wipers, an intermediate wiper, and actuating mechanism having provision for moving all the wipers together and having separate means for moving the intermediate wiper lengthwise of the last and moving the lateral wipers transversely of the last.

56. In a machine of the class described, end lasting mechanism comprising connected lateral wipers, an intermediate wiper, actuating mechanism having provision for moving all the wipers together and including means for positively moving the intermediate wiper lengthwise of the last and yielding means for moving the lateral wipers together transversely of the last.

57. A machine of the class described having, in combination, means for pulling-over a shoe comprising grippers located at the toe and at opposite sides of the fore part, means for causing the grippers to pull the upper and draw it over the edge of the last, power operated wipers for forcing the upper into lasted position about the toe portion of the last, supports which occupy, during the upper pulling operation, a position remote from the shoe to permit unobstructed observation of the shoe by the workman and means for effecting relative movement of the shoe and said supports into position for the supports to hold the shoe for the operation of the wipers.

58. A machine of the class described having, in combination, means for pulling-over a shoe comprising grippers located at the toe and at opposite sides of the fore part, means for causing the grippers to pull the upper and draw it over the edge of the last, power operated wipers for forcing the upper into lasted position about the toe portion of the last, and power operated means for inserting tacks to secure the upper at the sides of the shoe.

59. A machine of the class described having, in combination, means for pulling-over a shoe comprising grippers located at the toe and at opposite sides of the fore part, means for causing the grippers to pull the upper and draw it over the edge of the last, power operated wipers for forcing the upper into lasted position about the toe portion of the last, means for securing the upper at the sides, and means for securing the upper about the toe end of the last.

60. A machine of the class described having, in combination, means for pulling-over a shoe, and power operated mechanisms for forcing the upper into lasted position about the toe portion of the shoe and inserting fastenings at opposite sides of the shoe.

61. A machine for working an upper into lasted position, having in combination, means for holding a last and shoe upper in position to be lasted, wipers having forming edges adapted to wipe the edge of the upper about the end of the last simultaneously on the opposite sides of the last with a sliding wiping movement, and intermittently operating power mechanism for said machine including means for automatically actuating the wipers to do their work while the shoe is held as described and having provision for automatically stopping while the shoe is controlled by the holding means to enable the operator to inspect the shoe before the operation of the machine is completed.

62. A machine for working an upper into lasted position; having in combination, means for holding a last and shoe upper in position to be lasted, coöperating overworking devices to grip, stretch and wipe over the upper into lasted position about the end of the last, and intermittently operating power driven mechanism for said devices including means for automatically actuating the wipers to do their work and having provision for automatically stopping with the upper under tension whereby opportunity is given for the operator to inspect the work before the wipers lay the upper into finally lasted position.

63. A machine for working an upper over a last, having in combination, end lasting wipers movable lengthwise of the last from inoperative to operative position and adapted to act upon opposite sides of the toe simultaneously, means for securing the overwiped upper in lasted position, and power operating mechanism for said wipers and securing means.

64. A machine for working an upper over a last, having in combination, end lasting wipers adapted to act upon opposite sides of the shoe simultaneously, mechanism for inserting a plurality of tacks simultaneously to secure the upper in lasted position about the end of the shoe, and connected operating mechanism for said overwiping and tacking mechanisms.

65. A pulling over and lasting machine, having in combination, pulling over means including power operated gripping devices, lasting devices operatively connected with the gripping devices to wipe over the last bottom a continuous section of upper extending from one side of the last around the toe to the opposite side and held by the pulling means, and means to fasten the upper in overwiped position.

66. A machine of the class described having, in combination, means for holding a shoe, and end lasting wipers including connected lateral wipers and a central wiper movable together lengthwise of the shoe, the lateral wipers being also pivotally mounted for movement toward the median line of the shoe while the central wiper is moved relatively to them in a path substantially parallel with the median line of the shoe.

67. A machine of the class described having, in combination, means operating at the sides of the ball and the tip of the toe to pull over an upper, including means for properly positioning the upper on the last, and independent automatically operating lasting means for turning inwardly the upper at the corners of the toe.

68. A machine of the class described having, in combination, means for pulling an upper over a last including means for gripping the upper at the opposite sides of the ball and at the end of the toe and operating to stretch the upper and lay it over the last bottom, and means operating automatically to turn in the upper at the corners of a shoe adjacent to the toe gripper.

69. A machine of the class described having, in combination, means for pulling an upper over a last including means for gripping the upper at the opposite sides of the ball and at the end of the toe and operating to stretch the upper and lay it over the last bottom, and devices independent of said pulling devices to turn in the upper at the corners of the toe during the pulling-over operation.

70. A machine of the class described having, in combination, means including relatively movable toe end and side grippers to pull over an upper with its lines arranged in proper relation to a last, and lasting means movable first bodily lengthwise of the shoe automatically and then transversely of the shoe from opposite sides of the last to turn inwardly over the last bottom the upper at the corners of the toe of the last.

71. A machine of the class described having, in combination, means for pulling an upper over a last including means for gripping the upper at the opposite sides of the ball and at the end of the toe and operating to stretch the upper and lay it over the last bottom, and additional mechanism operating automatically to turn the upper inwardly and backwardly over the last bottom at the corners of the toe.

72. A machine of the class described having, in combination, means for pulling an upper over a last, including means for gripping the upper at the opposite sides of the ball and at the end of the toe and operating to stretch the upper and lay it over the last bottom, and means operating automatically to turn inwardly over the last bottom at the corners of the toe the portions of upper on opposite sides of the toe gripper which normally tend to project outwardly in the pulled over shoe.

73. A machine of the class described having, in combination, pulling-over means including means to seize and pull a shoe upper at the opposite sides of the ball and at the toe end, and provision to adjust the upper and last relatively, and lasting devices operated automatically to gather inwardly over the edge of the last bottom the upper between the toe and the side grippers.

74. In a machine of the class described, end lasting mechanism comprising end lasting means 92, lasting devices 80, 80 and actuating mechanism including the carrier 75, the wedge 86 and the abutment 85 relatively arranged to cause the said devices to move transversely of the shoe and to hold within the path of said lasting means portions of upper located at the sides of the shoe ahead of the portion of the upper initially engaged by the lasting means in its advance over the shoe bottom by the actuating mechanism.

75. In a machine of the class described, upper securing means, and lasting mechanism comprising a carrier movable lengthwise over the shoe bottom, lasting devices mounted thereon movable transversely over the shoe bottom, and actuating mechanism for causing said devices to force inwardly and hold in the path of the securing means portions of stock to be secured.

76. In a machine of the class described, end lasting mechanism comprising end lasting means movable lengthwise of the shoe, and lasting devices movable inwardly over the shoe bottom from the opposite sides of the shoe in advance of the end lasting means and serving to hold against forward displacement and in the path of the end lasting means certain portions of the upper stock located ahead of the starting position of the end lasting means, said mechanism being movable lengthwise of the last from inoperative to operative relation to the last.

77. In a machine of the class described, end lasting mechanism comprising end lasting means, pivoted lasting devices arranged at opposite sides thereof and acting transversely of the shoe to force the stock from the two sides of the shoe inwardly into the path of the end lasting means, and mechanism for advancing the end lasting means to cause it to include within its field of action stock located in front of its starting position and which has been restrained by said lasting devices from forward displacement by the advancing lasting means.

78. In a machine of the class described, end lasting mechanism comprising pivoted lasting devices to engage the upper at the opposite sides of the last and having operative movements transversely of the last only and other lasting means operating between said lasting devices and having an operative movement lengthwise of the last relatively to said lasting devices.

79. A machine of the class described having, in combination, pulling-over means including side and toe grippers, side tacker mechanisms movable over the sides of the shoe to fasten the upper pulled by the side grippers, a toe tacker mechanism movable over the shoe bottom to fasten the upper pulled by the toe gripper, and means mounted on the toe tacker and constructed and arranged to gather inwardly from opposite corners of the toe upper stock into position to be fastened by the toe tacker mechanism.

80. A machine of the class described having, in combination, pulling-over means including side and toe grippers, side tacker mechanisms movable over the sides of the shoe to fasten the upper pulled by the side grippers, a toe tacker mechanism movable over the shoe bottom to fasten the upper pulled by the toe gripper, and toe lasting mechanism mounted on the toe tacker mechanism for actuation thereby during the movement of the tacker mechanism to fastening position.

81. A machine of the class described having, in combination, pulling-over means including side and toe grippers, side tacker mechanisms movable over the sides of the shoe to fasten the upper pulled by the side grippers, a toe tacker mechanism movable over the shoe bottom to fasten the upper pulled by the toe gripper, and toe lasting mechanism mounted on the toe tacker mechanism for actuation thereby during the movement of the tacker mechanism to fastening position and including a toe end abutment and wiper plates the advance of which is arrested when said abutment engages the shoe and the closing movement of which is effected by continued advance of the tacking mechanism.

82. In a machine of the class described, an end lasting mechanism having an end wiper, means to advance it, pivoted work-engaging members partaking of the advance of the wiper and adapted for transverse movements relative to said wiper, means engaging the shoe to arrest the advance of said members, and a wedge carried by the wiper to engage and cause movement of the work-engaging members when the wiper advances relatively to them.

83. In a machine of the class described having grippers for pulling an upper on a last and constructed and arranged to permit relative movement of the grippers to adjust the upper about the last, the combination with said grippers of power operated means for working the upper into lasted position about the toe portion of the last.

84. In a machine of the class described, end lasting mechanism comprising means for forcing the upper into lasted position at the toe end of the last and also relatively movable wipers pivoted on opposite sides of the end lasting means and constructed and arranged to clamp the upper against the edge of the last at the sides of the toe and hold the upper against forward movement along the edge of the last while the upper is being forced into lasted position by the first-mentioned means.

85. In a machine of the class described the combination of wipers constructed and arranged to work into finally lasted position a continuous section of upper extending from one side of the last around the toe to the other side of the last, power driven mechanism for operating the wipers to advance and wipe the upper over the edge of the last, means for engaging the upper at the toe, and power driven mechanism organized relatively to said wiper operating mechanism to actuate said means to engage the upper before the operation of the wipers and remain in engagement with the upper while the wipers advance.

86. In a machine of the class described the combination of wipers constructed and arranged to work into finally lasted position a continuous section of upper extending from one side of the last around the toe to the other side of the last, power driven mechanism for operating the wipers to advance and wipe the upper over the edge of the last, means for engaging the upper at the toe, means for operating said means to engage the upper before the operation of the wipers and remain in engagement with the upper while the wipers advance, and means for automatically causing a rest in the machine's operation after the first-mentioned means engages the upper and before the operation of the wipers.

87. An automatic toe lasting machine having in combination, toe embracing wipers having a bodily movement lengthwise of the shoe and closing over the shoe bottom to lay the upper into lasted position around the curved toe end of a last, power operated means independent of the wipers for gripping and holding the upper, and power driven means for actuating the wipers while the upper is held by the grippers.

88. An automatic toe lasting machine having in combination, toe embracing wipers to lay the upper into lasted position around the curved toe end of a last, power operated means independent of the wipers for gripping and holding the upper, means to stop the machine after the upper is gripped, and power driven means operating when the machine is started again to advance the wipers while the grippers continue to hold the upper.

89. A machine of the class described having in combination, last supporting means, a bottom rest, wipers constructed and arranged to embrace the toe portion of a shoe and work into finally lasted position a continuous section of upper extending from one side of the last around the toe to the other side of the last, and power operated means for clamping the shoe between the last support and the bottom rest and holding it until the completion of the overwiping movement of the wipers, advancing the wipers to lay the upper into lasted position, and returning the wipers to open position.

90. In a machine of the class described the combination of wipers constructed and arranged to work into finally lasted position against the shoulder or rib of a channeled sole or innersole a continuous section of upper extending from one side of the last around the toe to the other side of the last, power driven means for operating the wipers to lay the upper over the edge of the last and hold it while it is fastened and thereafter to return to shoe receiving position, and power driven means organized with relation to the wiper operating means for engaging the upper above the wipers before the wipers are actuated and holding it while the wipers advance.

91. A machine of the class described having, in combination, power operated wipers constructed and arranged to work into finally lasted position a continuous section of upper extending from one side of the last around the toe to the other side of the last, a bottom rest formed to engage the sole at a plurality of points spaced a substantial distance apart transversely and lengthwise of the shoe to position the sole with its feather in a plane substantially parallel with the plane of action of said power operated wipers preparatory to the operation of the wipers, means acting through the upper of the forepart of the shoe and coöperating with the bottom rest to hold the shoe firmly throughout the operation of the wipers, said bottom rest and coöperating means being normally separated to permit free introduction of a shoe between them, grippers located at opposite sides of the toe and with reference to which the shoe is located for the operation of the machine, and power operated means for causing said engaging means to take hold of the shoe and control its position with relation to said wipers during the operation of the wipers.

92. A machine of the class described having, in combination, wipers constructed and arranged to work into finally lasted position a continuous section of upper extending from one side of the last around the toe to the other side of the last, power driven mechanism for operating the wipers to do their work and return automatically to starting position, devices to assist the operator in locating the shoe for the operation of the machine, and power operated mechanism to take hold of the shoe and control its position with relation to the wipers during the operation of the wipers, said holding mechanism comprising means to engage the insole at a plurality of points spaced a substantial distance apart and means acting through the upper of the forepart of the shoe to uphold the last, said two means being normally separated to permit the free introduction of a shoe between them and operating before the action of the wipers to position the shoe automatically with the plane of the feather substantially parallel with the plane of the wipers.

93. A machine of the class described having, in combination, a frame or post, wipers supported thereon and constructed and arranged to work into finally lasted position a continuous section of upper extending from one side of a last around the toe to the other side of the last, and power driven mechanism for operating the wipers to do their work and return automatically to starting position, said wipers with their operating mechanism being arranged to present an open shoe-receiving space in front of and below the wipers, means to assist the operator in locating the shoe for the operation of the machine, and power operated means to take hold of the shoe and control its position with relation to the wipers during the operation of the wipers.

94. A machine of the class described having, in combination, a frame or post, wipers supported thereon and constructed and arranged to wipe into finally lasted position a continuous section of upper extending from one side of the last around the toe to the other side of the last, means to assist the operator in locating the shoe for the operation of the machine, means for taking hold of the shoe, and power operated mechanism for causing the shoe holding means to seize the shoe and control its position during the operation of the wipers, for causing the wipers to do their work and return to starting position, and for causing the shoe holding means to release the shoe.

95. A machine of the class described having, in combination, a frame or post, wipers supported thereon and constructed and arranged to wipe into finally lasted position a continuous section of upper extending from one side of a last around the toe to the other side of the last, means to assist the operator in locating the shoe for the operation of the machine, means for taking hold of the shoe, and power operated mechanism for causing the shoe holding means to seize the shoe and control its position during the operation of the wipers, for causing the wipers to do their work and return to starting position, and for causing the shoe holding means to release the shoe, said holding means and actuating mechanism being arranged to present an open shoe-receiving space in front of and below the wipers.

96. A machine for working over a last the forepart of a shoe upper having, in combination, wipers constructed and arranged to work into finally lasted position a continuous section of upper extending from one side of the last around the toe to the other side of the last, grippers to tension the upper for the action of the wipers thereon, and automatically intermittent power operating mechanism for effecting said wiping and tensioning operations arranged to stop the machine at a predetermined point in its cycle to permit examination of the shoe and thereafter to complete the work and return the operating parts to starting position.

97. A machine for working over a last the forepart of a shoe upper having, in combination, wipers constructed and arranged to work into finally lasted position a continuous section of upper extending from one side of the last around the toe to the other side of the last, grippers to tension the upper for the action of the wipers thereon, means for clamping and holding the last and upper in position to be lasted, and automatically intermittent power operating mechanism for effecting said tensioning, clamping and wiping operations arranged to stop at a predetermined point in the machine's cycle and thereafter to proceed to complete the operations, release the shoe, and return the operating parts to starting position.

98. A machine for working over a last the forepart of a shoe upper having, in combination, wipers constructed and arranged to work into finally lasted position a continuous section of upper extending from one side of the last around the toe to the other side of the last, grippers to tension the upper for the action of the wipers thereon, means for engaging the insole at a plurality of points to level the shoe for the operation of the wipers, and coöperating means acting through the upper of the forepart of the shoe to clamp the last, automatically intermittent power operating mechanism for effecting the leveling, clamping and tensioning operations and causing a pause in the machine's operation, said mechanism being arranged to operate after the machine is restarted to cause a working movement of the wipers and thereafter to restore all the parts to original position.

99. A machine for giving final lasted form to the toe portion of a shoe having, in combination, wipers constructed and arranged to embrace the shoe from one side of the last around the toe end to the other side of the last, power operated mechanism including a shoe bottom rest and opposed last supporting means normally separated and operating automatically to seize and uphold by the forepart only a last presented between them, said rest being constructed and arranged to position the shoe with the feather of the insole in a predetermined relation to the machine and to depress the shoe to carry the feather of the insole to the plane of the wipers, and power driven actuating mechanism for the wipers.

100. A machine for giving final lasted form to the toe portion of a shoe having, in combination, wipers constructed and arranged to embrace the shoe from one side of the last around the toe end to the other side of the last, shoe holding mechanism comprising a shoe bottom rest which is constructed and arranged to level the forepart of the last longitudinally and transversely for the operation of the wipers, and opposed last supporting means normally separated from the bottom rest, the shoe holding mechanism being constructed and arranged to permit free introduction of the shoe, to have unrestricted control of the shoe during said leveling operation, and thereafter to hold the shoe rigidly for the operation of the wipers, and one power driven means for operating the wipers and the shoe holding mechanism.

101. A machine for giving final lasted form to the toe portion of a shoe having, in combination, forwardly advancing and inwardly closing wipers constructed and arranged to embrace the shoe from one side of the last around the toe to the other side of the last, means to engage and hold the portion of upper to be acted upon by the toe embracing wipers, a shoe bottom rest, last supporting means which are adapted to clamp the forepart of the shoe against the bottom rest and have movement, after the upper is gripped, into operative position to uphold the shoe for the action of the wipers, and one power driven operating mechanism for the wipers and supporting means.

102. A machine for pulling over a shoe and giving final lasted form to the toe portion of the shoe having, in combination, pulling over means, power operated means for lasting a continuous section of the upper extending from one side of the forepart around the toe end to the other side, and a rest movable automatically into supporting engagement with the heel end of the shoe after the pulling over means has begun to stretch the upper and in time to resist the backward thrust of the forepart lasting means.

103. A machine of the class described having, in combination, pulling over means, power driven toe lasting means operating to force over the last bottom a continuous section of upper extending from one side around the toe to the other side, heel resting means self-adapting to the heel ends of right and left crooked lasts the foreparts of which are positioned similarly relatively to the lasting means, and means for automatically moving the heel resting means into operative position.

104. A machine of the class described having, in combination, forepart resting means for a shoe, means to fix the shoe in position against said forepart resting means, power operated forepart lasting means, and heel resting means movable laterally of the shoe for supporting the differently positioned rear parts of shoes on right and left crooked lasts the foreparts of which are similarly positioned relatively to the lasting means.

105. A machine of the class described having, in combination, forepart resting means for a shoe, means to fix the shoe in position against said forepart resting means, power operated forepart lasting means, heel resting means movable laterally of the shoe for supporting the differently positioned rear parts of shoes on right and left crooked lasts the foreparts of which are similarly positioned relatively to the lasting means, and automatic means for advancing the heel resting means into shoe supporting position.

106. A machine of the class described having, in combination, means for drawing an upper about the sides of a last, power operated means for working over the last bottom a continuous section of the upper extending from one side of the forepart around the toe to the other side of the forepart, a heel rest occupying during the first part of the operation a position clear of the shoe to permit the upper to be drawn freely, and means for moving the heel rest into position to sustain the last against rearward thrusts of the overworking means.

107. A machine of the class described having, in combination, means for drawing an upper up about the sides of a last, power operated means for working over the last bottom a continuous section of the upper extending from one side of the forepart around the toe to the other side of the forepart, a heel rest occupying during the first part of the operation a position clear of the shoe to permit the upper to be drawn freely, and automatically operating means for moving the heel rest against the last in time to resist the rearward pressure of the means that works the upper over the toe of the last.

108. A pulling-over machine having, in combination, means for pulling an upper at different points, means for laying the upper in lasted position over the innersole from one side of the shoe around the toe to the other side of the shoe, means for securing the overlaid upper to the innersole, and power driven operating mechanism for the overlaying and securing means, the combination being adapted for working on uppers placed loosely over a last, whereby said uppers are pulled over the last and are secured in lasted position around the forepart of the last.

109. In a machine of the class described, a toe tacker movable from outside the edge of the shoe bottom into tack inserting position, toe wipers carried by the tacker and adapted to be advanced by the tacker and closed by engagement with the shoe during the advance of the tacker to tack inserting position, and means to operate the tacker.

110. In a machine of the class described, a toe tacker movable from outside the edge of the shoe bottom into tack inserting position, toe wipers carried by the tacker and adapted to be advanced by the tacker and closed automatically when they reach position to wipe the upper over the shoe bottom, and means to move the tacker to and from tack inserting position and to cause it to drive tacks when it reaches that position.

111. In a machine of the class described, a toe tacker movable from outside the edge of the shoe bottom into tack inserting position, toe wipers, connections permitting relative bodily movement of the tacker and wipers lengthwise of the shoe and adapted to cause the wipers to be closed by a portion only of such relative movement, and operating means to advance and retract the tacker and to cause it to insert fastenings in time relation to the wiper closing movement to fasten the upper in overwiped position.

112. A pulling-over machine having, in combination, pulling-over means, and toe lasting means constructed and arranged to press the upper over the corners of the toe while the fullness is free to accumulate at the middle of the toe and subsequently to wipe the upper over the middle of the toe.

In testimony whereof I have signed my name to this specification in the presence of two subscribing witnesses.

RONALD F. McFEELY.

Witnesses:
CHARLES E. GRUSH,
ARTHUR L. RUSSELL.

Copies of this patent may be obtained for five cents each, by addressing the "Commissioner of Patents, Washington, D. C."

It is hereby certified that in Letters Patent No. 1,135,950, granted April 13, 1915, upon the application of Ronald F. McFeely, of Beverly, Massachusetts for an improvement in "Machines for Use in the Manufacture of Boots and Shoes," an error appears in the printed specification requiring correction as follows: Page 12, line 60, claim 75, for the word "and" read *end;* and that the said Letters Patent should be read with this correction therein that the same may conform to the record of the case in the Patent Office.

Signed and sealed this 11th day of January, A. D., 1916.

[SEAL.]

J. T. NEWTON,

*Acting Commissioner of Patents.*

Cl. 12—4.